United States Patent
Hartman

(10) Patent No.: US 8,843,563 B1
(45) Date of Patent: Sep. 23, 2014

(54) PROCESSING COMMUNICATIONS FOR INCREASED HANDLING EFFICIENCY

(75) Inventor: Michael Hartman, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 2475 days.

(21) Appl. No.: 10/955,592

(22) Filed: Sep. 30, 2004

(51) Int. Cl.
*G06F 15/16* (2006.01)

(52) U.S. Cl.
USPC .......................................... 709/206

(58) Field of Classification Search
USPC ........................... 709/206, 204, 224; 715/752
See application file for complete search history.

(56) References Cited

U.S. PATENT DOCUMENTS

| | | | | |
|---|---|---|---|---|
| 5,608,870 A * | 3/1997 | Valiant | ........................... | 711/100 |
| 5,796,732 A * | 8/1998 | Mazzola et al. | ............... | 370/362 |
| 6,098,149 A * | 8/2000 | Ofer et al. | ....................... | 711/112 |
| 6,101,532 A * | 8/2000 | Horibe et al. | ................. | 709/206 |
| 6,601,091 B1 * | 7/2003 | Spilo | ............................. | 709/217 |
| 7,043,237 B2 * | 5/2006 | Snyder et al. | .................. | 455/425 |
| 7,127,486 B1 * | 10/2006 | Reistad et al. | ................. | 709/204 |
| 7,185,065 B1 * | 2/2007 | Holtzman et al. | ............ | 709/217 |
| 7,200,636 B2 * | 4/2007 | Harding | ......................... | 709/206 |
| 7,386,589 B1 * | 6/2008 | Tanumihardja et al. | ....... | 709/206 |
| 7,392,280 B2 * | 6/2008 | Rohall et al. | ................... | 709/201 |
| 7,930,706 B1 * | 4/2011 | Walsh et al. | ................... | 719/330 |
| 8,065,375 B2 * | 11/2011 | Reistad | ......................... | 709/206 |
| 2001/0025300 A1 * | 9/2001 | Miller et al. | ................... | 709/206 |
| 2002/0178223 A1 * | 11/2002 | Bushkin | ......................... | 709/205 |
| 2002/0194502 A1 * | 12/2002 | Sheth et al. | .................... | 713/201 |
| 2003/0028607 A1 * | 2/2003 | Miller et al. | ................... | 709/206 |
| 2003/0229716 A1 * | 12/2003 | Holland | ......................... | 709/246 |
| 2004/0103407 A1 * | 5/2004 | Blaukopf et al. | .............. | 717/140 |
| 2005/0223066 A1 * | 10/2005 | Buchheit et al. | .............. | 709/206 |
| 2006/0182055 A1 * | 8/2006 | Coffee et al. | .................. | 370/328 |
| 2011/0282956 A1 * | 11/2011 | Reistad | ......................... | 709/206 |

FOREIGN PATENT DOCUMENTS

GB 2395320 A * 5/2004 ................ G06F 9/00

* cited by examiner

*Primary Examiner* — Jerry Dennison
(74) *Attorney, Agent, or Firm* — Barnes & Thornburg LLP

(57) ABSTRACT

Messages for processing by a user are analyzed before being presented to the user. Where multiple messages require substantially the same response or action, they are presented in aggregate to the user so that the user can review a single message, prepare a single response, and this response can be distributed to the original message senders, resulting in improved message handling efficiency. Automated servers for responding to client requests can similarly store such requests for a period of time, match all identical or similar requests received during this time period, and generate a single response to the multiple requests, thereby reducing the duplication of system resource uses.

12 Claims, 6 Drawing Sheets

PROCESSING COMMUNICATIONS FOR INCREASED HANDLING EFFICIENCY

FIELD OF THE INVENTION

The present invention relates to the processing of electronic communications, messages, and client requests to servers.

The invention has application in contact centers, messaging systems and automated servers which respond to client requests.

BACKGROUND OF THE INVENTION

Multimedia contact centers allow agents to deal with queries, complaints or other issues raised by remote users (referred to herein as "customers", irrespective of whether they are actually buying products or services from the call center organisation) who contact the call center by live telephone call or video call, or by message, such as leaving voicemail, sending email, submitting a web form, sending a mobile telephony text message, and the like.

In searching for increased efficiency it is common to automate responses where possible, to filter calls through interactive voice response systems, to encourage callers to send or leave messages, or to encourage customers to visit a website. A primary reason for this is that while processing power and speed is increasing, enabling increased automation, the necessity for live agents to handle communications is at times crucial. It is the agents themselves whose resources can be most valuable to the contact center, and increasing the efficiency of the agents' work is always desirable.

Ironically, when resources are scarce and customers become dissatisfied with the service level provided by the call center, they will often unwittingly exacerbate the scarcity of resources by sending emails, submitting web forms, leaving voicemail messages and calling the center. Each such communication, with effectively the same content, sent by the same sender, has to be dealt with or marked as completed, all of which can consume agent resources. This invention has application in increasing the efficiency with which agents can respond to messages for handling at the call center.

Similarly, there can be large numbers of similar requests from different customers, each of which needs to be dealt with, and the present invention has application in increasing the efficiency of handling such communications.

Such problems are not confined to contact centers. Regular individual users of email and voicemail systems find that large amounts of their time are spent reviewing and responding to messages which are similar in content or relate to the same issue, or are from the same sender but possibly relate to a number of issues. Even in the purely automated world of web servers, multiple individual requests for the same information need to be responded to. While this is not particularly problematic for simple HTML page requests, resources can be drained more quickly when the requests require databases to be queried and pages to be dynamically built in response to each request.

SUMMARY OF THE INVENTION

The invention provides a message processing system of the type which presents messages to a user and enables a user to respond to the messages. The system includes:

a) a processor which analyses messages before they are presented to the user of the system, thereby identifying a subset of messages which share one or more common characteristics;

b) a message generator which generates an aggregate message (such as a composite of all the messages in the subset or a summary of all those messages) which is representative of the subset of messages; and c) an output for presenting the aggregate message to the user.

In this way the user can formulating a response to the aggregate message which is suitable as a response to each of the messages in the subset.

Preferably, the user can formulate a single response which is suitable for responding to each of the messages. In some cases the user may need to formulate a small number of responses to adequately deal with all of the original messages.

By processing the messages before they reach the user of the system (who might be a contact center agent or simply an individual using a voicemail or email system), messages can be grouped together by common characteristic, and a single message can be responded to. This avoids the need for the user to respond or even individually review each message.

The criteria used to identify messages as sharing common characteristics (belonging to a subset) can include: the origin of a message, the content of a message, timestamps on messages (this can be in combination with other criteria, for example all messages including the word "explosion" received within 2 hours of an explosion occurring at a chemical plant), or the language of a message (different subsets could be created to provide different language press releases).

Preferably, the aggregate message generator concatenates some or all of the content of messages in the subset and the output presents the concatenated message content in a single message. Thus, a number of emails or web forms could be amalgamated into a single message with headers, signatures and so on stripped away, so that the body of the aggregate message contains only the body of each of the contributing emails and web forms. Similarly, a number of live voice calls, each of which has been processed with an interactive voice response (IVR) system, could be identical as a group from the similar or identical IVR responses made by the callers, and a summary of the IVR responses could be presented to an agent.

Alternatively, the aggregate message generator can generate an aggregate message comprising one or more representative messages selected from the subset of messages.

As a further alternative, the aggregate message generator can generate a summary of the messages in the subset of messages.

Examples of messages suitable for analysis include, but are not limited to, voice messages, video messages, text messages, emails, web-based forms and scanned correspondence items, and live voice or video calls.

Preferably, the system also includes:

d) a response generator which receives the (usually single) response formulated by the user, and which generates from that response one or more response messages addressed to the source(s) of the subset of messages; and e) a communications module for communicating those one or more response messages to the source(s).

As an example, if numerous emails are all determined to relate to a single issue and to require a single response, the user might only receive a summary or a representative sample (provided as the "aggregate message"). The user formulates a single response, and this is returned to the message processing system. The response generator of the system takes on the task of forwarding this response to each of the original message senders.

In a preferred embodiment, the message processing system is a contact center message processing system and the user is a contact center agent.

Such a system will preferably also include an interface with a queuing system of the contact center, the interface providing the aggregate message as a contact for queuing by the queuing system.

Contact centers often maintain queues of "contact requests" which are small tokens containing pointers to the actual calls held on a switchboard or to the actual emails held on a mail server (to give two examples). In the context of this invention, the aggregate message can be used to generate a "contact request" in the contact center queuing system which is queued and dealt with by an agent in similar manner to the "normal" individual contact requests. To facilitate this, the system should have an interface with the queuing system.

Preferably, the interface enables the message processing system to remove from the queuing system a contact requests relating to an existing message if that existing message can be included in the subset of messages. The interface can also enable the message processing system to update the queuing system with a contact requests relating to the aggregate message generated from the subset.

For example, when a newly received message is found to match an existing message which has its own contact request in a queue, that contact request can be removed (to prevent that existing message being responded to by an agent). Optionally, the original contact request can be left in the queue until such time as either it or aggregate is processed, whichever comes first. In tandem with this, an aggregate message, containing both the newly received message and the existing message, can be generated and a contact request relating to the aggregate message can be inserted into the queue. The aggregate message can take the place of the contact for the older message or can be inserted at any other point in the queue (or even in a different queue such as one with higher priority or one only containing aggregate message contacts).

The invention also provides a method of processing messages of the type which are presented to a user for a response, the method including the following steps:
 a) analyzing a plurality of messages before the messages are presented to the user, and thereby determining a subset of the messages sharing a common characteristic;
 b) generating an aggregate message including information which is representative of the subset of messages; and
 c) presenting the aggregate message to the user;
whereby the user can respond to each message in the subset by formulating a response to the aggregate message.

The invention also provides a computer program product comprising a non-transitory computer-readable medium storing and/or recording program instructions in machine readable form. When the program is executed in a message processing system it causes the system to:
 a) analyze a plurality of messages before the messages are presented to the user, and thereby determine a subset of the messages sharing a common characteristic;
 b) generate an aggregate message including information which is representative of the subset of messages; and
 c) present said aggregate message to the user;
whereby the user can respond to each message in the subset by formulating a response to the aggregate message.

The invention also provides a contact center having a queuing system for queuing contacts and assigning contacts to agents, one or more agent workstations providing an interface to communications corresponding to the contacts, the communications including messages requiring a response, and a message processing system as defined above for processing messages before they are presented to the agents.

In another aspect the invention provides a request handler for receiving and automatically responding to client requests made to a server, the request handler including:
 a) an engine for generating responses to the client requests;
 b) a processor for analyzing client requests to determine matches between one or more client requests received in a given time period;
 c) a memory for storing a set of client requests received in that time period which are determined to match;
 d) a controller for forwarding to the engine, at the termination of that time period, a single request effective to generate a single response to the set of client requests; and
 e) an output for returning the single response to each client request in the set.

This request handler reduces the number of times the same response needs to be generated by the server to duplicate requests for the same information. For example, a web page which provides a front end for a database, so that Internet users can submit queries to the database, will typically send out identical information to many users in any short period of time. If one considers a search engine, for example, or a busy travel booking portal, it will be appreciated that many users will be submitting the same request in any given time period. The method described above will hold such matching requests for a short time (perhaps several seconds, in the case of a web site where quick response times are required), and generate a database query for all the matching requests at the end of that short time period, before returning the results of the query to each requestor.

Accordingly there is also provided a method of receiving and automatically responding to client requests made to a server, the method including the steps of:
 a) analyzing client requests to determine matches between one or more client requests received in a given time period;
 b) storing a set of client requests received in that time period which are determined to match;
 c) forwarding to a response engine at the termination of that time period a single request effective to cause the response engine to generate a single response to the set of client requests; and
 d) returning that single response to each client request in the set.

A computer program product comprising a non-transitory computer-readable medium storing and/or recording program instructions in machine readable form, wherein the program can be run on a server to cause the server to carry out this method.

BRIEF DESCRIPTION OF DRAWINGS

The invention will now be illustrated by the following descriptions of embodiments thereof given by way of example only with reference to the accompanying drawings, in which.

DETAILED DESCRIPTION OF PREFERRED EMBODIMENTS

Figure 1:
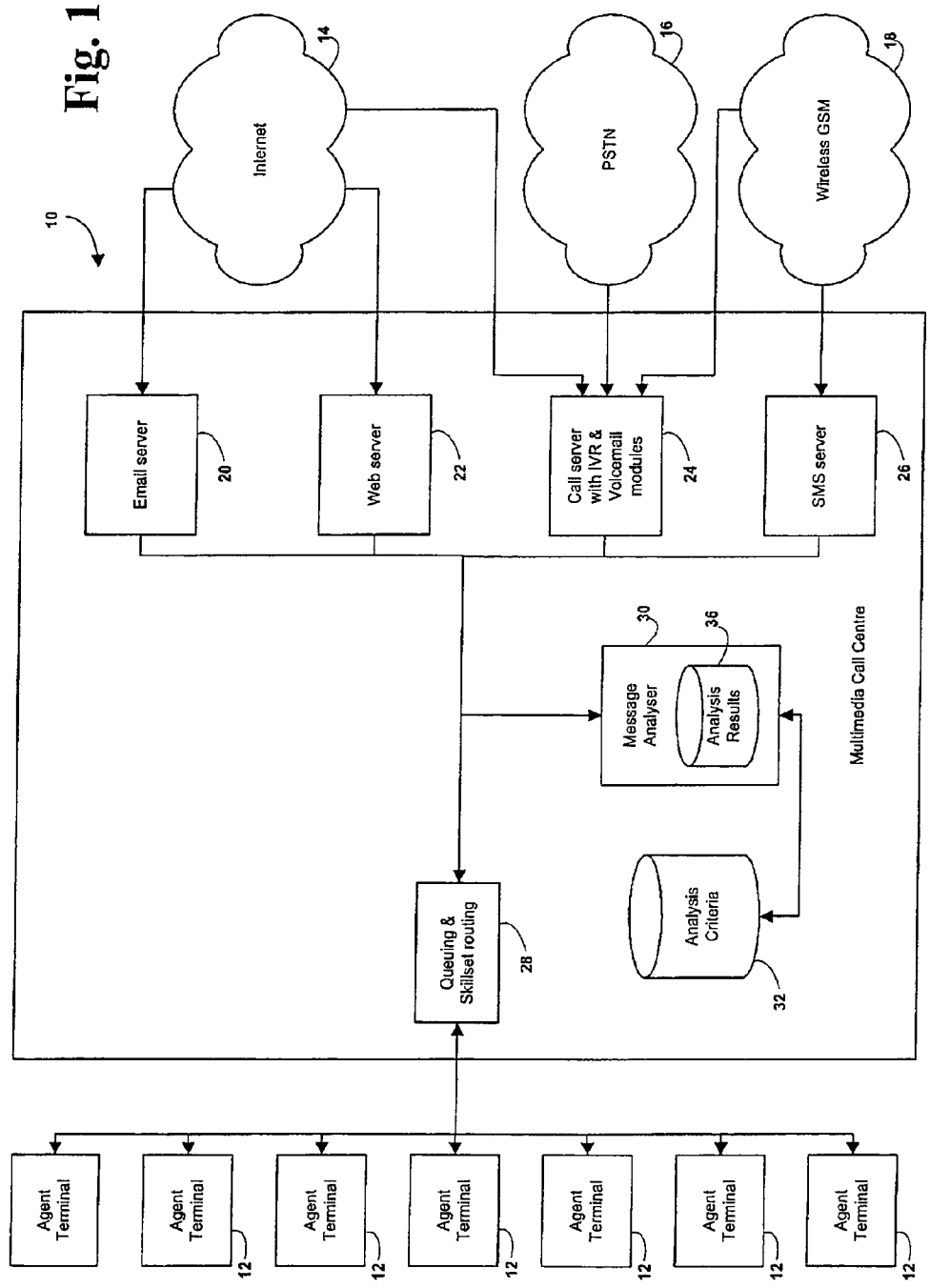
FIG. 1 is a block diagram of a contact center according to the invention.

FIG. 1 shows a contact center management system 10 enabling communication between a plurality of agent terminals 12 and remote customers (not shown) communicating with the call center by communications networks such as the Internet 14, the public switched telephone network (PSTN) 16 and a wireless cell phone network 18 such as the global system for mobiles (GSM) network. The call center 10 includes a number of servers for handling incoming and outgoing communications of different media types. Thus, an email server 20 and a web server 22 provide interfaces with the Internet 14. A call server 24 having an interactive voice response (IVR) module and an integrated or connected voicemail server provides an interface with the PSTN network 16, and an SMS (short messaging service) server 26 receives and sends text messages via the GSM network 18. Whereas conventional call centers will route incoming communications to appropriate agents using a queuing and skillset routing function 28, this can result in a large number of requests all requiring very similar responses being individually processed.

Figure 2:
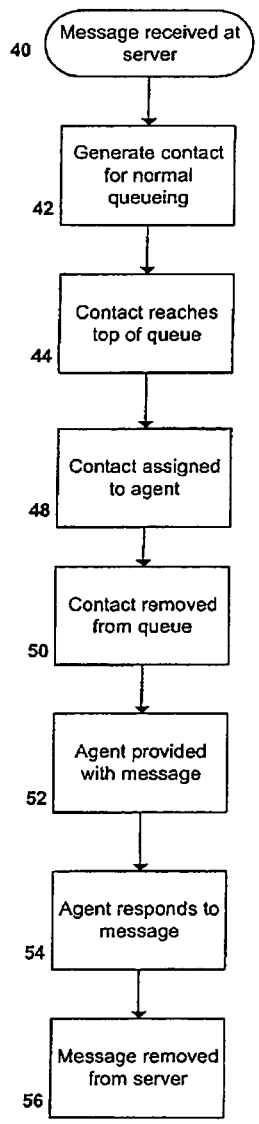
FIG. 2 is a flow chart illustrating an overview of a conventional method of managing incoming messages to the call center.

FIG. 2 illustrates in overview a conventional method of processing messages. In step 40, when a message is received at a server such as the email server 20, the server notifies the queuing and skillset routing function 28 which generates a contact for normal queuing in a queue along with other contacts relating to items requiring a similar agent skillset, step 42. When this contact reaches the top of its queue, step 44, the contact is assigned to a suitable free agent, step 48 and removed from the queue, step 50. Each agent terminal is equipped with agent software which uses the information in the assigned contact to access the message on the server, step 52. When the agent is provided with the message, the contact is removed from the queue, step 52. The agent will respond to the message in an appropriate fashion, step 54, and the message is then removed from the server to an archive, step 56 (or is marked as completed, or simply deleted).

Whereas conventional call centers will route incoming communications to appropriate agents using a queuing and skillset routing function 28, this can result in a large number of requests all requiring very similar responses being individually processed. One example of this would be in cases where a company is involved in a breaking news story. Many hundreds or thousands of enquiries might be received, each requiring nothing more than a standard press release or response. While the time can be reduced by agents using the same template response, it will nevertheless take up significant resources just to deal with the sheer numbers of messages requiring a response. Another example is where a single customer sends multiple messages all relating to the same issue. There is a significant risk of duplication with one agent providing a callback to a voice message and another sending an email response to an email which is in substance the same as the voicemail message.

U.S. patent application Ser. No. 10/108,686 assigned to Nortel Networks Limited and entitled "Managing Communications in a Call Center", discloses a method of assigning incoming communications to threads, thereby enabling an agent to call up a record of past interactions regarding the same issue. This can go some way towards solving the problem of a customer sending multiple communications relating to one issue, but it still requires that each contact be reviewed by an agent even if the query has been dealt with.

Figure 3:
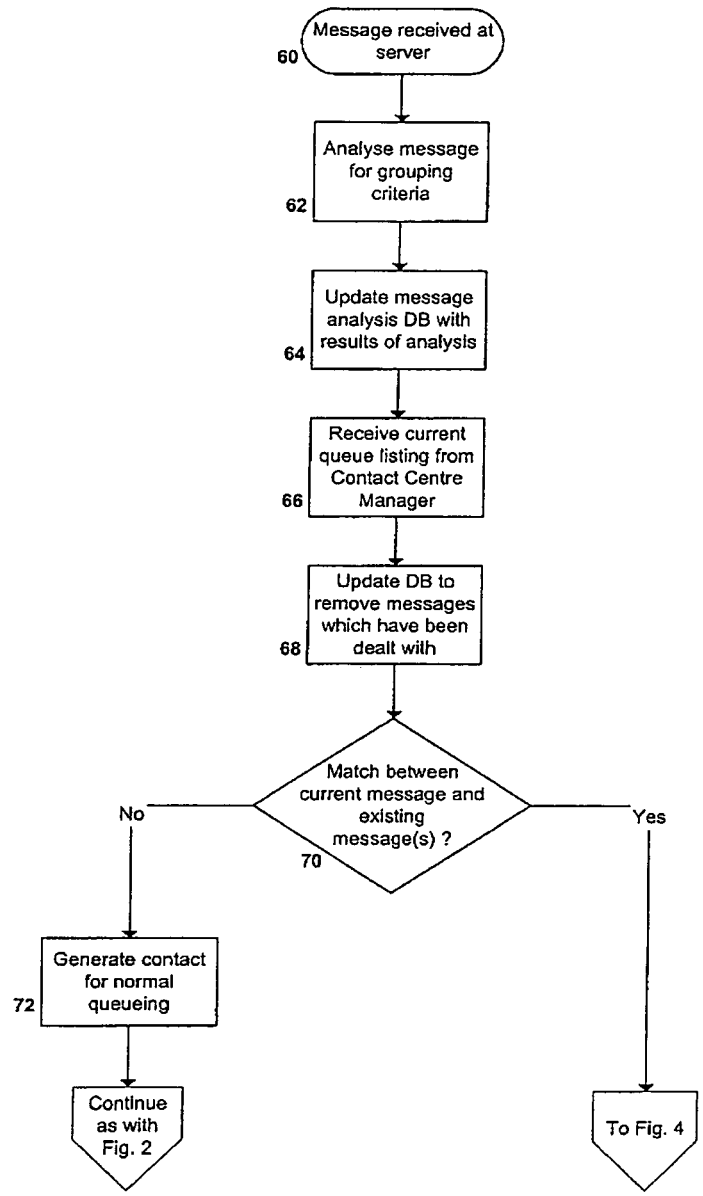
FIG. 3 is a flow chart illustrating the initial stages of an improved method of message processing.

The contact center of FIG. 1 is provided with a message analyser 30 which has access to a rules store 32 having a set of rules for analysing messages (analysis criteria). Referring to FIG. 3, when new messages are received, step 60, the message analyser pre-processes the incoming messages (or the subject-matter of incoming voice/video calls, as explained below) and classifies the messages according to the criteria in store 32, step 62. The criteria can be, for example message origin, content, language, or timestamp. Different media type messages (voice, email, web form, SMS) can be analysed using either the same or different criteria.

For example if messages are to be grouped according to origin, voice messages might be analysed to determine the originating caller line identification (CLID), by a speech to text analysis (e.g. "My name is John Doe from Acme Industries") or by voice print characteristics (e.g. high security applications might only provide support to registered individuals whose voice print characteristic is stored to allow voice recognition), to give a few examples. Emails might be classified by origin using email address, a signature within the email body, a customer reference number quoted in the subject field or message body, or by routing information in the header. Web forms might be classified by originating address or by name/address/order number/customer number information provided in a field of the form. In an integrated multimedia contact center, any or all of these identifiers might be stored in a customer database allowing separate voicemail messages, emails and web forms to be grouped together as having a common sender.

If messages are to be grouped by content (either alone or in combination with other characteristics), they might be subjected to any suitable form of textual analysis, keyword matching, product ID code matches, etc. They could be further categorised by message tone, such as using language analysis to group mild complaints on a given topic separately from more strongly worded complaints. The aforementioned criteria of language and timestamp of message can be further used to categorise the messages. Further criteria can of course be used as appropriate for any given application.

Live voice or video calls can be processed in the same ways (e.g. asking the callers to state their query, or asking them to speak the flight number they are enquiring about), or they can be processed through an IVR menu system, with menu choices made providing analysis of the query. If such analysis allows a number of live calls to be grouped together, the calls can be placed on hold, and the analysis results presented as an aggregate message to an agent. The agent can then speak a response message, which is played back to each of the callers on hold, thereby answering their query.

The message analyser 30, which can be a plug-in software component, for example, has a message analysis results database 36 in which it stores, for each message analysed, the results of that analysis, step 64. Thus, in the simplest case where messages are only to be aggregated together on the basis of the sender's identity, a database record might be added for each message received indicating the message ID on the server (voicemail no. 35232), the criteria used (CLID=1-555-321-4321) and the determined identity from a customer database (Customer No. 549). An email message might have an entry such as message ID (email no. 814418), the criteria used (from: johndoe@acmeindustrialcorp.com), and the determined identity (Customer No. 549).

Before proceeding further, the message analyser receives, step 66, an updated listing of the current queues to determine which entries (if any) in the message analysis results database 36 have been dealt with or are no longer queued. The purpose of this is to ensure that in the following step of matching new messages with existing messages, only those which are in the queues are used for potential matches. The message analysis results database 36 is then updated to remove the results analysis for any messages which have been dealt with, step 68.

The message analyser then searches for a match between the newly analysed message and those messages already in the database, step 70. The degree of matching required is of course left up to the designers of the system. In effect part of the goal is to amalgamate or aggregate all messages which can be dealt with together by an agent and so the matching function should be geared towards this goal. To give a single example, if the content analysis for a technical support contact center reveals that the new message contains the phrases ["Windows 98" or "Win98"], ["Product X" or "Product ID 231"], ["software conflict" or "program conflict" or "crashes"] and ["Product Y" or "product ID 44"], then this message might be matched with all other messages containing the same (or equivalent) phrases, on the assumption that they all relate to a known conflict between two software products, X and Y, on systems running the Windows 98 operating system.

If no match is found, the message is handled in conventional manner, i.e. a contact is generated for the message, step 72, and the processing carries on as indicated in FIG. 2 beginning with step 42.

Figure 4:
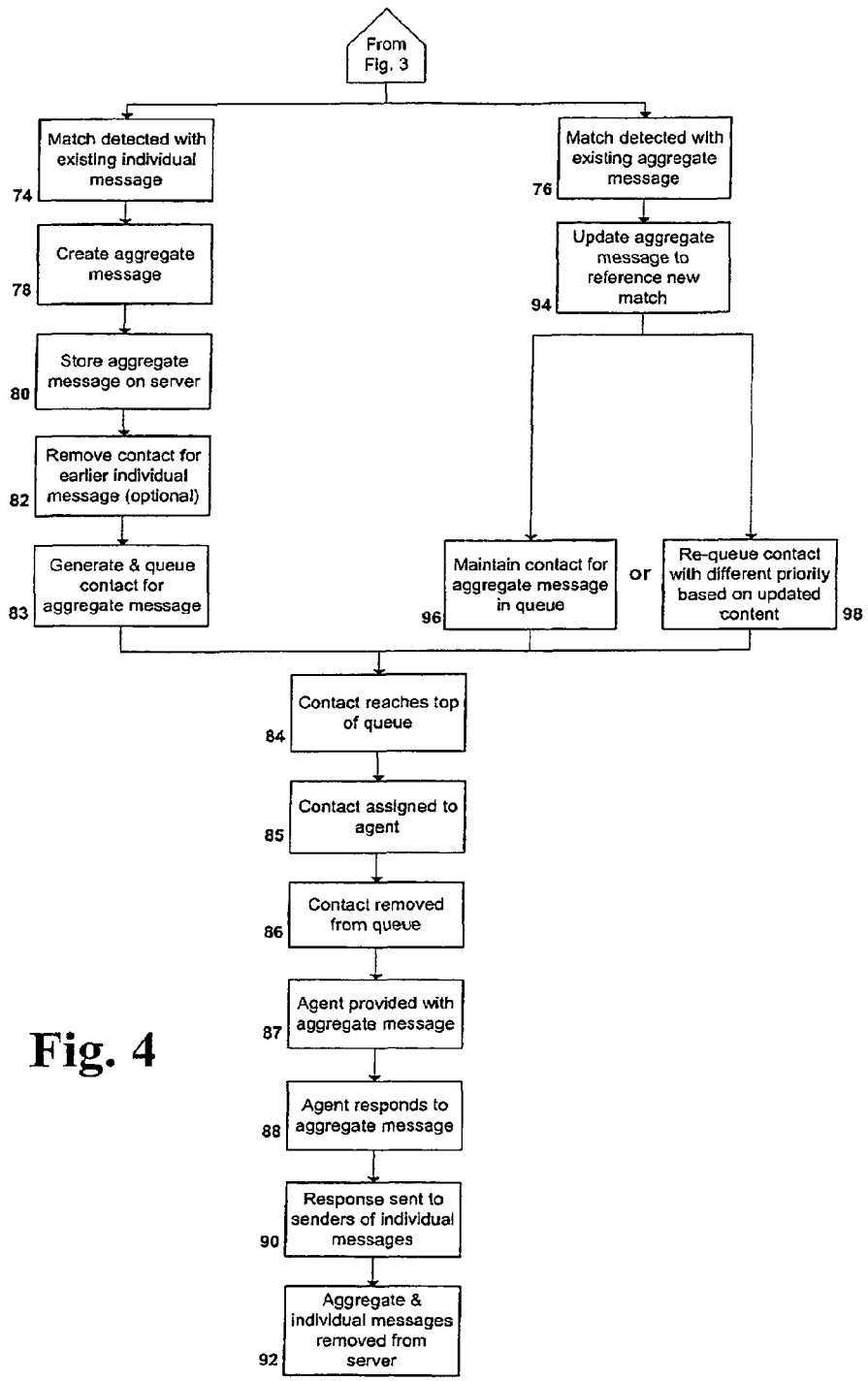
FIG. 4 is a flow chart illustrating further stages of the improved method of message processing.

If a match is found, the process proceeds to FIG. 4. The detected match can be with an existing individual message, step 74, or with an already created aggregate message, step 76 (explained further below). Dealing with the case of step 74, a match with an existing queued individual message, an aggregate message is created in step 78. This can be done in one of a number of ways. Most simply, the text of both messages can be concatenated together in a new message which contains pointers to the original messages, either visible or hidden. Alternatively, a summary can be generated of the two messages, or one of the messages can be used as a representative message of the matching subset.

The aggregate message generated in step 78 is stored on the server in step 80. This enables it to be treated by the contact center software and agent workstation software just like any normal message. When the aggregate message has been created and stored, the contact for the existing queued message (with which a match was found) is optionally removed from the queue, step 82, and a new contact is queued for the aggregate message, step 83. Alternatively, the original contact request can continue to queue until such time as it or the related aggregate contact is handled by the user. The priority assigned to the aggregate message can be higher (since it will use resources more efficiently) or in the case where an existing aggregate is modified, it can be re-queued with a different priority reflecting the entirety of its new content. It can be placed in a dedicated queue. It can even replace the removed contact for the existing queued individual message.

When the aggregate contact reaches the top of the queue, step 84, it is assigned to an agent, step 85. The contact is removed from the queue, step 86, and the agent is provided with the aggregate message, step 87. The agent reviews the contents of the aggregate message and prepares a suitable response, step 88. Depending on the degree of confidence in the matching system and in the creation of the aggregate message, the agent may never need to know that this was an aggregate message or may need to take no further account of it. However, the option can also be provided for the agent to scan down through the component messages (in the case that the aggregate message is a concatenation of all of the component messages) and to click on sections which are determined to require a different response. Such messages can then be presented separately to the agent for an individual response. However, in the majority of cases the matching and aggregate message creation should be sufficiently accurate that the agent can simply compose a response to the issue contained in the aggregate message and send this as a reply, step 88. The server, on receiving the response from the agent, distributes this to the original senders of the component messages, step 90, following which the individual and aggregate messages may be removed from the server, step 92.

In cases where some or all of the component messages used to create the composite message came from a single source, then the agent response can simply be sent back once to that sender. The server can have rules which cause it to look at the aggregate message and the response to that message and decide on a response distribution policy. Alternatively, the contact request for the aggregate message may be arranged such that the agent's client software routes all responses to the aggregate message generation component of the message processing system. This aggregate message generator can receive the agent reply and translate this into individual replies to the senders of the component messages, or to a representative sender.

In the case where the newly analysed message is found to match with an earlier created aggregate message, step 76, the aggregate message (which is already queued as a contact) can simply be updated to include the new message as a further source, step 94, with the content of the new message being added if appropriate (e.g. in cases where the aggregate message is a concatenation of all of the component individual messages). The contact for the aggregate message is maintained in the queue, step 96, or can be re-queued with different priority as discussed above, step 98, and when it reaches the top of the queue in step 84, the further processing of the aggregate message is as described above.

Figure 5:
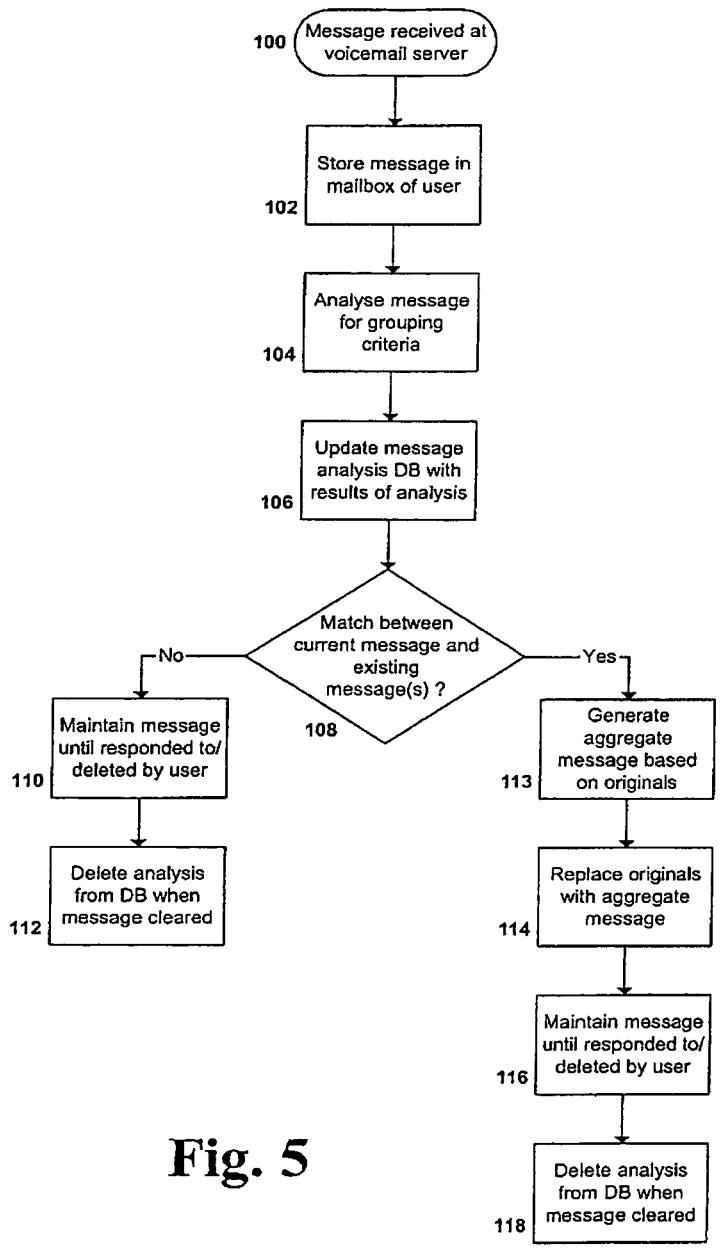
FIG. 5 is a flow chart illustrating an improved method of message processing in a voicemail system.

In another embodiment, the method of the invention is adapted for use in a conventional voicemail system, as illustrated in the flowchart of FIG. 5. This method can equally be adapted for use in other types of message server. When a message is received at a voicemail server, step 100, it is stored in the mailbox of the destination user, step 102. A plug-in software component analyses the content or origin of the message as described above to provide matchable analysis results, step 104, and these results are stored in a database, step 106. The analyzer does not have to be plug in—it could be an integral component of a voicemail system. A comparison is then made to determine if there is a match between the new message and existing messages, step 108. If there is not, then the message is treated as normal, i.e. it is maintained in memory until the user has reviewed, responded to or deleted it from his mailbox, step 110, following which the analysis results are cleared from the database, step 112.

However, if the new message is determined to match with an existing stored message, then an aggregate message is generated based on the originals or component messages, step 113. In the simplest case of a voicemail system where analysis is by message origin, the aggregate message can simply concatenate all of the messages from any given sender together. This enables the mailbox user to review just a single message from that sender, allowing the user to skip forward through the message more quickly. For more sophisticated systems, the message content can be analysed using speech recognition or other methods, and if it is determined that the sender left a number of "call me" messages, then the aggregate message can present just a single one of these (perhaps the first, the last, or the longest). The originals can be replaced with the aggregate message to reduce storage space, step 114 (though this is optional and it may be determined to be safer to archive the original component messages to allow review by the user if desired). The aggregate message is then maintained until it has been dealt with, step 116, following which the analysis results are again deleted from the database, step 118.

Figure 6:
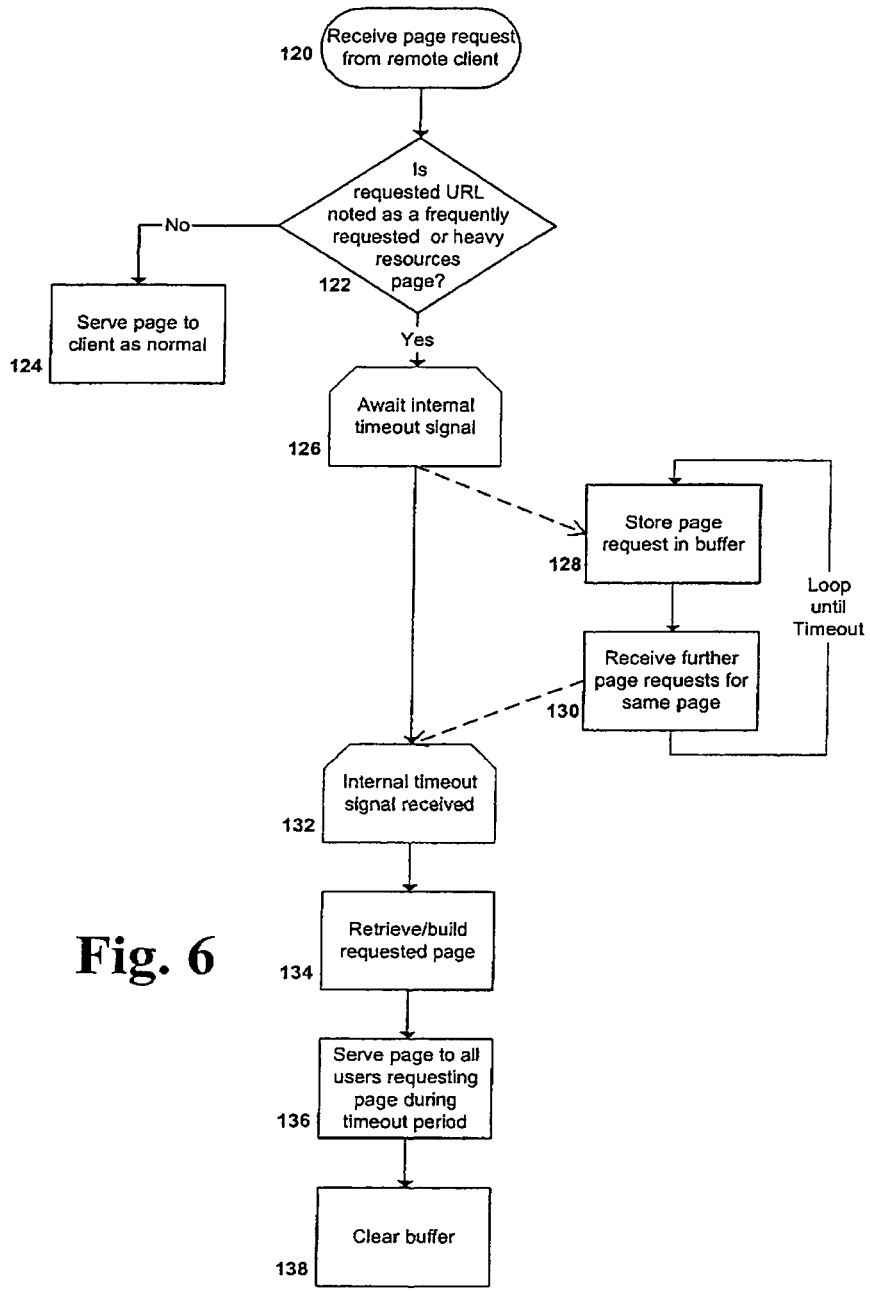
FIG. 6 is a flow chart illustrating an improved method of request handling in a web server.

A method of increasing request handling efficiency on a web server is shown in FIG. 6. This method can be adapted for other types of automated servers which generate responses to client requests. For illustrative purposes, the method is described in the context of a web server which performs database lookups and builds web pages in response to the results of the requested database lookups.

A page request is received from a client, step 120. It is determined in step 122 whether this page request is for a frequently requested or resource-intensive URL, i.e. one which can benefit from modified handling. If not, then the page is served to the client as normal, step 124.

If, however, the requested page is determined to require improved handling, a timeout loop is initiated between steps 126 (await timeout) and 132 (timeout signal received). Normally, the server will generate an internal timeout signal periodically. In the case of a web page server the timeout period might be a few seconds. While the loop awaits termination at the timeout signal of step 132, the page request is stored in a buffer, step 128. If further page requests are received for the same page, step 130, i.e. requests requiring the same system resources to generate a response, then these too are stored in the buffer.

After the timeout signal, step 132, the requested action is taken by the server. This might be, for example, to perform a database lookup and to generate a dynamically built web page based on the lookup results, step 134. The server builds the page once and then serves it to each requesting client, step 136. The buffer is then cleared, step 138.

The invention is not limited to the embodiments described herein which may be varied without departing from the spirit of the invention.

What is claimed is:

1. A computer implemented contact center message processing system of the type which presents messages to a contact center agent and enables the contact center agent to respond to the messages, the system comprising:
   a) a processor for analyzing a plurality of messages before said messages are presented to said contact center agent, whereby the processor determines a subset of said messages sharing a common characteristic;
   b) an aggregate message generator for generating information which is representative of said subset of messages, wherein said information comprises at least one of i) a summary of said messages in said subset of messages and ii) concatenated text of at least two of said messages in said subset of messages; and for creating an aggregated message having a header and a body, wherein said information is provided in the body of the aggregated message;
   c) a queuing system configured to generate an aggregate contact for the aggregated message and locating said aggregate contact into a queue of contacts; the aggregated message being assigned a priority which determines the position of the aggregate contact in the queue of contacts;
   d) an output for presenting said aggregate message to said contact center agent once said aggregate contact reaches the top of the queue;
   e) a response generator for receiving a single response to said aggregate message formulated by the contact center agent and generating therefrom one or more response messages addressed to one or more source(s) of said subset of messages; and
   f) a communications module for communicating said one or more response messages to said source(s).

2. A computer implemented message processing system as claimed in claim 1, wherein said processor is programmed to identify the origin of a message and to assign messages to a subset according to their origin.

3. A computer implemented message processing system as claimed in claim 1, wherein said processor is programmed to analyze the content of a message and to group messages according to their content.

4. A computer implemented message processing system as claimed in claim 1, wherein said processor is programmed to determine a timestamp of a message and to group messages according to their timestamp.

5. A computer implemented message processing system as claimed in claim 1, wherein said processor is programmed to determine the language of a message and to group messages according to their language.

6. A computer implemented message processing system as claimed in claim 1, wherein said aggregate message generator operates to concatenate some or all of the content of messages in the subset and the output presents the concatenated message content in a single message.

7. A computer implemented message processing system as claimed in claim 1, wherein said message processing system is selected from:
   i) a voicemail system and said user is a user of the voicemail system; and
   ii) an email system and said user is a user of the email system.

8. A computer implemented message processing system as claimed in claim 1, wherein said messages are selected from voice messages, video messages, text messages, emails, web-based forms, scanned correspondence items, voice calls and video calls.

9. A computer implemented message processing system as claimed in claim 1, wherein an interface with the queuing system enables the message processing system to remove from the queuing system a contact relating to an existing message upon determining that said existing message can be included in said subset of messages, and said interface enabling the message processing system to update the queuing system with a contact relating to the aggregate message generated from said subset.

10. A computer-implemented method of processing messages of the type which are presented to a contact center agent of a contact center for a response, the method comprising:
   a) analyzing a plurality of messages before said messages are presented to said contact center agent, and thereby determining a subset of said messages sharing a common characteristic;
   b) generating information which is representative of said subset of messages, wherein said information comprises at least one of i) a summary of said messages in said subset of messages and ii) concatenated text of at least two of said messages in said subset of messages; and creating an aggregated message having a header and a body, wherein said information is provided in the body of the aggregated message;

c) generating an aggregate contact for the aggregated message and locating said aggregate contact into a queue of contacts; the aggregated message being assigned a priority which determines the position of the aggregate contact in the queue of contacts;

d) presenting said aggregate message to said contact center agent once said aggregate contact reaches the top of the queue;

e) receiving a single response to said aggregate message formulated by the contact center agent and generating therefrom one or more response messages addressed to one or more source(s) of said subset of messages; and f) communicating said one or more response messages to said source(s).

11. A computer program product comprising a non-transitory computer readable medium for storing or recording instructions in machine readable form which when executed in a computer implemented message processing system cause said system to:

a) analyze a plurality of messages before said messages are presented to a contact center agent, and thereby determining a subset of said messages sharing a common characteristic;

b) generate information which is representative of said subset of messages, wherein said information comprises at least one of i) a summary of said messages in said subset of messages and ii) concatenated text of at least two of said messages in said subset of messages; and creating an aggregated message having a header and a body, wherein said information is provided in the body of the aggregated message;

c) generating an aggregate contact for the aggregated message and locating said aggregate contact into a queue of contacts; the aggregated message being assigned a priority which determines the position of the aggregate contact in the queue of contacts;

d) present said aggregate message to said contact center agent once said aggregate contact reaches the top of the queue;

e) receive a single response to said aggregate message formulated by the contact center agent and generate therefrom one or more response messages addressed to one or more source(s) of said subset of messages; and f) communicate said one or more response messages to said source(s).

12. A contact center comprising a queuing system for queuing contacts and assigning said contacts to agents, one or more agent workstations providing an interface to communications corresponding to said contacts, said communications including messages requiring a response, and a computer implemented message processing system for processing messages before they are presented to said agents, said computer implemented message processing system comprising:

a) a processor for analyzing a plurality of messages before said messages are presented to said agents, whereby the processor determines a subset of said messages sharing a common characteristic;

b) an aggregate message generator for generating information which is representative of said subset of messages, wherein said information comprises at least one of i) a summary of said messages in said subset of messages and ii) concatenated text of at least two of said messages in said subset of messages; and for creating an aggregated message having a header and a body, wherein said information is provided in the body of the aggregated message; whereby the queuing system is configured to generate an aggregate contact for the aggregated message and locate said aggregate contact into a queue of contacts; the aggregated message being assigned a priority which determines the position of the aggregate contact in the queue of contacts; and c) an output for presenting said aggregate message to selected one of the agents once said aggregate contact reaches the top of the queue;

d) a response generator for receiving a single response to said aggregate message formulated by the selected agent and generating therefrom one or more response messages addressed to one or more source(s) of said subset of messages; and e) a communications module for communicating said one or more response messages to said source(s).

* * * * *